(12) United States Patent
Yeh et al.

(10) Patent No.: US 12,103,782 B2
(45) Date of Patent: Oct. 1, 2024

(54) FEEDING APPARATUS

(71) Applicant: Wistron Corp., New Taipei (TW)

(72) Inventors: Shun-Chi Yeh, New Taipei (TW); Fuhua Yan, New Taipei (TW); Zeshan Yan, New Taipei (TW); Chen Qin, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 17/863,288

(22) Filed: Jul. 12, 2022

(65) Prior Publication Data
US 2023/0331490 A1    Oct. 19, 2023

(30) Foreign Application Priority Data

Apr. 15, 2022    (CN) .......................... 202210393894.X

(51) Int. Cl.
*B65G 17/12*    (2006.01)

(52) U.S. Cl.
CPC .................................. *B65G 17/12* (2013.01)

(58) Field of Classification Search
CPC ............................ H05K 13/0404; B65G 17/12
See application file for complete search history.

(56) References Cited

U.S. PATENT DOCUMENTS

| | | | | |
|---|---|---|---|---|
| 9,045,183 | B2 * | 6/2015 | Laurence | B65G 17/12 |
| 9,132,873 | B1 * | 9/2015 | Laurence | B62D 65/024 |
| 10,420,265 | B2 * | 9/2019 | Zhang | H05K 13/0404 |
| 2016/0332301 | A1 * | 11/2016 | Kesil | B25J 11/0095 |

FOREIGN PATENT DOCUMENTS

| | | | | |
|---|---|---|---|---|
| CN | 103249291 A | | 8/2013 | |
| CN | 103508192 A | * | 1/2014 | |
| CN | 103575649 A | * | 2/2014 | |
| CN | 105499961 A | * | 4/2016 | |
| CN | 106426250 A | * | 2/2017 | .......... B25J 15/0033 |
| CN | 110883479 A | * | 3/2020 | ............ B23K 37/00 |
| CN | 112658648 A | | 4/2021 | |
| CN | 213444757 U | | 6/2021 | |
| TW | 201742546 A | | 12/2017 | |
| TW | M558699 U | | 4/2018 | |
| TW | M567691 U | | 10/2018 | |
| TW | M578121 U | | 5/2019 | |
| TW | M589190 U | | 1/2020 | |
| WO | WO-2018087854 A1 | * | 5/2018 | ............. H05K 13/02 |

* cited by examiner

*Primary Examiner* — Gene O Crawford
*Assistant Examiner* — Abby A Jorgensen

(57) ABSTRACT

A feeding apparatus is provided. The feeding apparatus includes an apparatus body, a container, an elevatable platform, and a pulling mechanism. The container is disposed in the apparatus body, wherein the container has a carrier unit, and the carrier unit is detachably connected to the container. The elevatable platform is disposed on the apparatus body, wherein the elevatable platform is adapted to be moved between the first height and the second height. The pulling mechanism is disposed on the elevatable platform, wherein the pulling mechanism is adapted to be moved relative to the container.

14 Claims, 18 Drawing Sheets

S1

FEEDING APPARATUS

CROSS REFERENCE TO RELATED APPLICATIONS

This application claims priority of China Patent Application No. 202210393894.X, filed on Apr. 15, 2022, the entirety of which is incorporated by reference herein.

BACKGROUND OF THE INVENTION

Field of the Invention

The present invention relates in general to a feeding apparatus, and it relates in particular to an automatic feeding apparatus.

Description of the Related Art

In a conventional feeding apparatus, the tray is moved by rollers. The tray carries one single kind of electronic element (for example, a module card). When the feeding apparatus needs to feed another kind of electronic element (for example, the module card of a different part number), the previous tray must be removed, and then the rollers move in another tray with the desired electronic element. This conventional feeding apparatus has poor feeding efficiency, and cannot supply different kinds of electronic elements (for example, module cards of different part numbers) to match adjustments to the production line.

Additionally, in a conventional feeding apparatus, the profiles of the electronic elements are identified by the image capturing unit, and then the robotic arm picks up the electronic element. The identification ability of the image capturing unit is limited. The jaws of the robotic arm may unexpectedly hit the electronic element, damaging it.

BRIEF SUMMARY OF THE INVENTION

Embodiments of the invention are provided to address the aforementioned difficulty.

In one embodiment, a feeding apparatus is provided. The feeding apparatus includes an apparatus body, a container, an elevatable platform and a pulling mechanism. The container is disposed in the apparatus body, wherein the container has a carrier unit, and the carrier unit is detachably connected to the container. The elevatable platform is disposed on the apparatus body, wherein the elevatable platform is adapted to be moved between a first height and a second height. The pulling mechanism is disposed on the elevatable platform, wherein the pulling mechanism is adapted to be moved relative to the container.

In one embodiment, the carrier unit comprises a carrier plate and a tray, a plurality of electronic elements are adapted to be disposed on the tray, the tray is disposed on the carrier plate, the pulling mechanism is adapted to horizontally pull the carrier plate and to move the carrier plate, the tray and the electronic elements from the container to the elevatable platform.

In one embodiment, the pulling mechanism comprises a hook unit, the hook unit is adapted to be moved between a first horizontal position and a second horizontal position, the hook unit is adapted to be wedged to the carrier plate and to horizontally move the carrier plate from the container to the elevatable platform.

In one embodiment, the carrier plate comprises a wedging member, the wedging member comprises two opposite wedging holes, the hook unit comprises two hooks, and the hooks are adapted to be wedged into the wedging holes.

In one embodiment, the feeding apparatus further comprises a robotic arm, wherein the robotic arm is adapted to pick up the electronic elements from the elevatable platform, the robotic arm comprises a first jaw unit, the first jaw unit comprises two surface jaws and two end jaws, the surface jaws are adapted to hold the electronic element in a first direction relative to the electronic element, the end jaws are adapted to hold the electronic element in a second direction relative to the electronic element, and the first direction is perpendicular to the second direction.

In one embodiment, the electronic element is a module card, the module card comprises a first surface, a second surface, a first edge and a second edge, the first surface is opposite to the second surface, the first edge is opposite to the second edge, the first surface and the second surface are located between the first edge and the second edge, the surface jaws are adapted to hold the first surface and the second surface, and the end jaws are adapted to hold the first edge and the second edge.

In one embodiment, the surface jaws are beak-shaped jaws.

In one embodiment, the end jaws are L-shaped jaws.

In one embodiment, the robotic arm comprises a second jaw unit, and the first jaw unit and the second jaw unit are arranged facing opposite directions.

In one embodiment, the feeding apparatus further comprises an image capturing unit, wherein the image capturing unit is disposed above the elevatable platform, and the image capturing unit is adapted to catch images of the tray and the electronic elements.

In one embodiment, the feeding apparatus further comprises a transit stage and a scanner, the robotic arm is adapted to put one of the electronic elements on the transit stage, and the scanner is adapted to scan the electronic element on the transit stage.

In one embodiment, the transit stage is adapted to be rotated 180 degrees relative to the scanner to modify the orientation of the electronic element on it.

In one embodiment, the transit stage comprises a slot, and the electronic element is adapted to be inserted into the slot.

In one embodiment, the feeding apparatus further comprises an assembly stage, wherein an electronic device is adapted to be placed on the assembly stage, and the robotic arm is adapted to pick up the electronic element from the transit stage and to assemble the electronic element to the electronic device.

In one embodiment, a feeding apparatus is provided. The feeding apparatus is adapted to receive electronic elements of different sizes. The feeding apparatus includes an apparatus body, a container, an elevatable platform and a pulling mechanism. The container is disposed in the apparatus body, wherein the elements are received in the container. The elevatable platform is disposed on the apparatus body, wherein the elevatable platform is adapted to be moved vertically. The pulling mechanism is disposed on the elevatable platform, wherein the pulling mechanism is adapted to be moved horizontally to move the electronic elements from the container to the elevatable platform.

In one embodiment of the invention, different containers can store different electronic elements. The trays located on the carrier plates of different layers can also store different electronic elements. Thereby, the electronic elements can be managed in different layers. In the embodiment of the invention, the designated tray can be accurately and stably taken out by the elevatable platform and the pulling mechanism and the designated electronic element can be picked up by the robotic arm. Thereby, automatic feeding is achieved. Compared with the conventional art, the feeding apparatus of the embodiment of the invention can supply different types of electronic elements (for example, module cards with different part numbers) at any time to match the adjustment of the production line.

In the embodiment of the invention, the assembling efficiency and the reliability of the product are improved by utilizing the robotic arm and the transit stage. Additionally, the jaws of the robotic arm are prevented from being hitting the electronic element unexpectedly.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
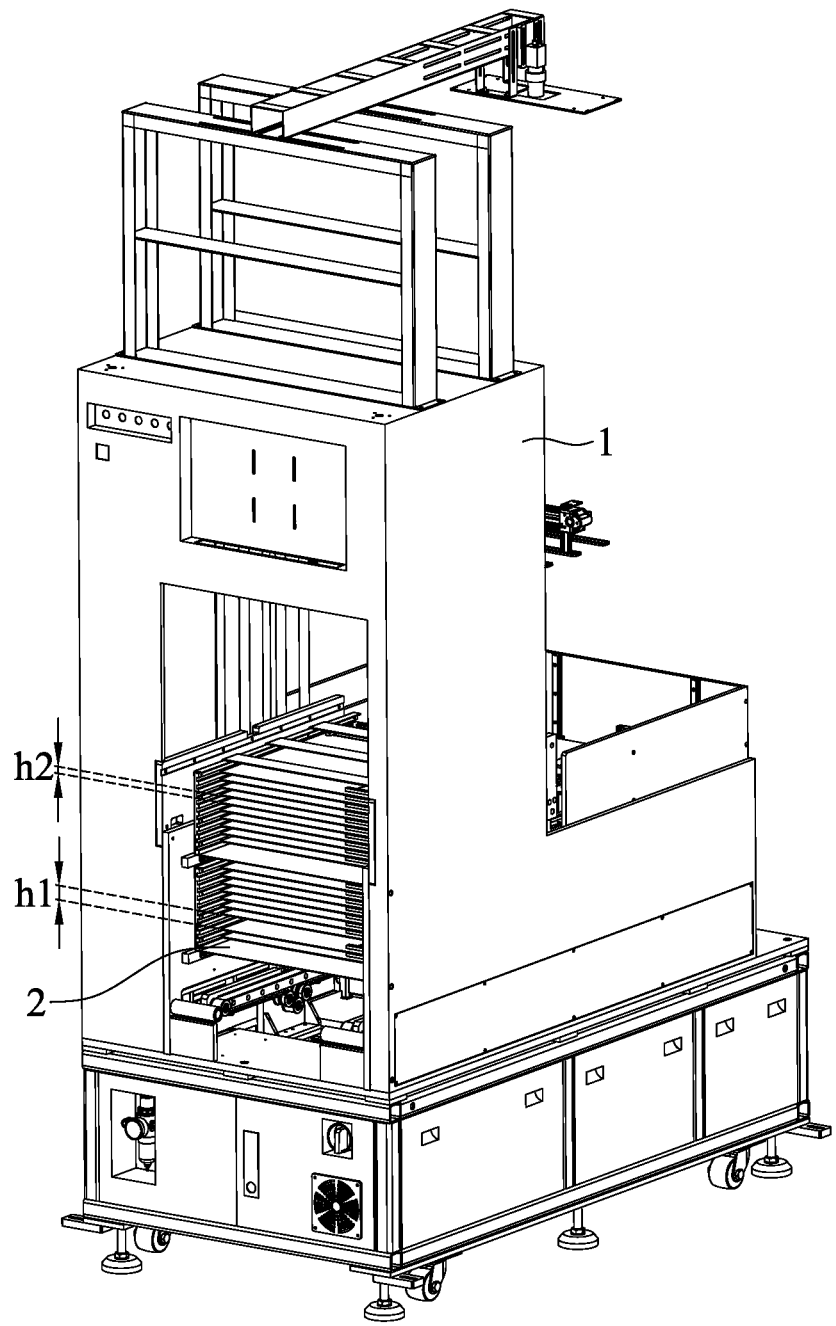
FIGS. 1A and 1B show a feeding apparatus of a first embodiment of the invention.
Figure 1B:
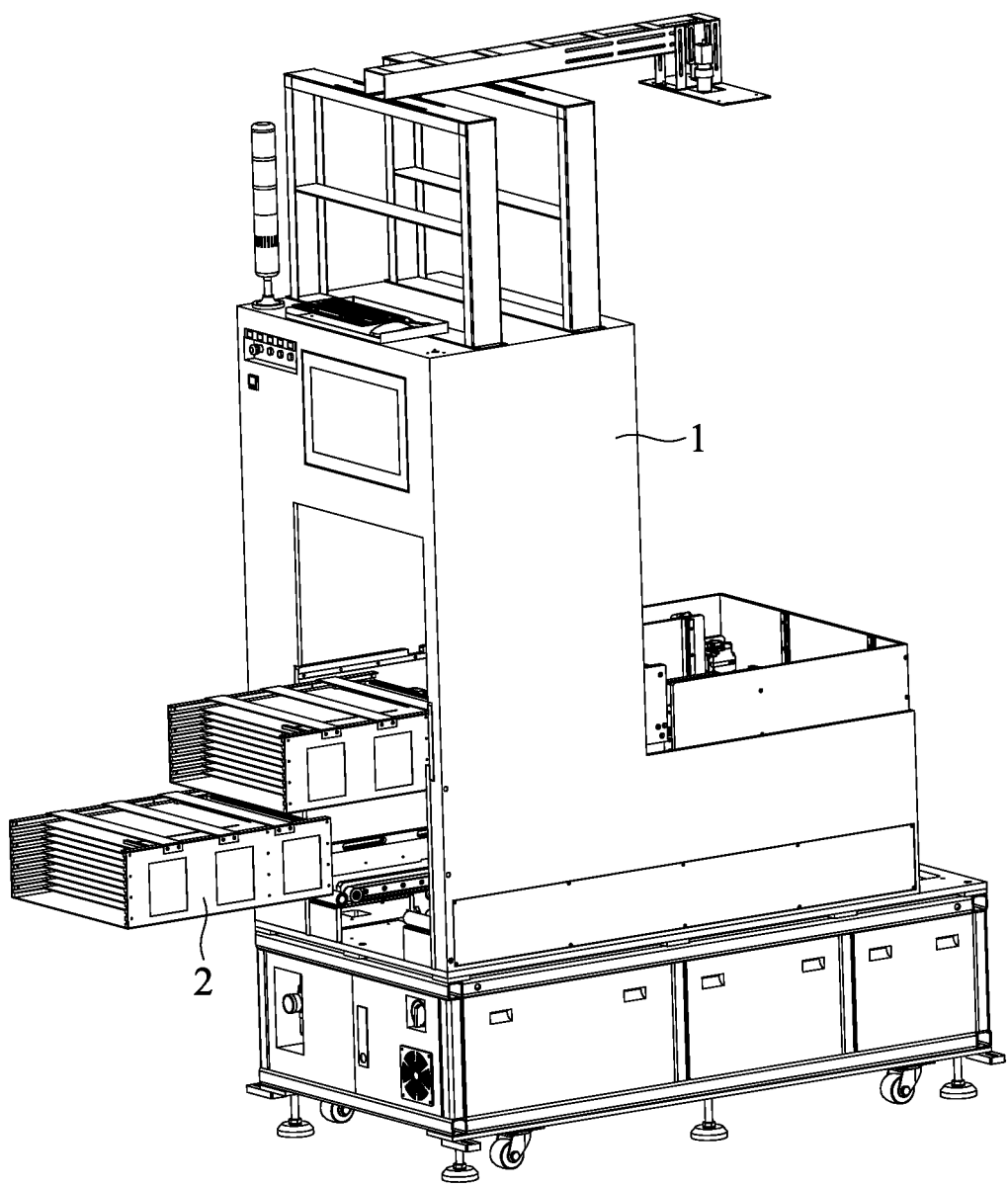
Figure 2A:
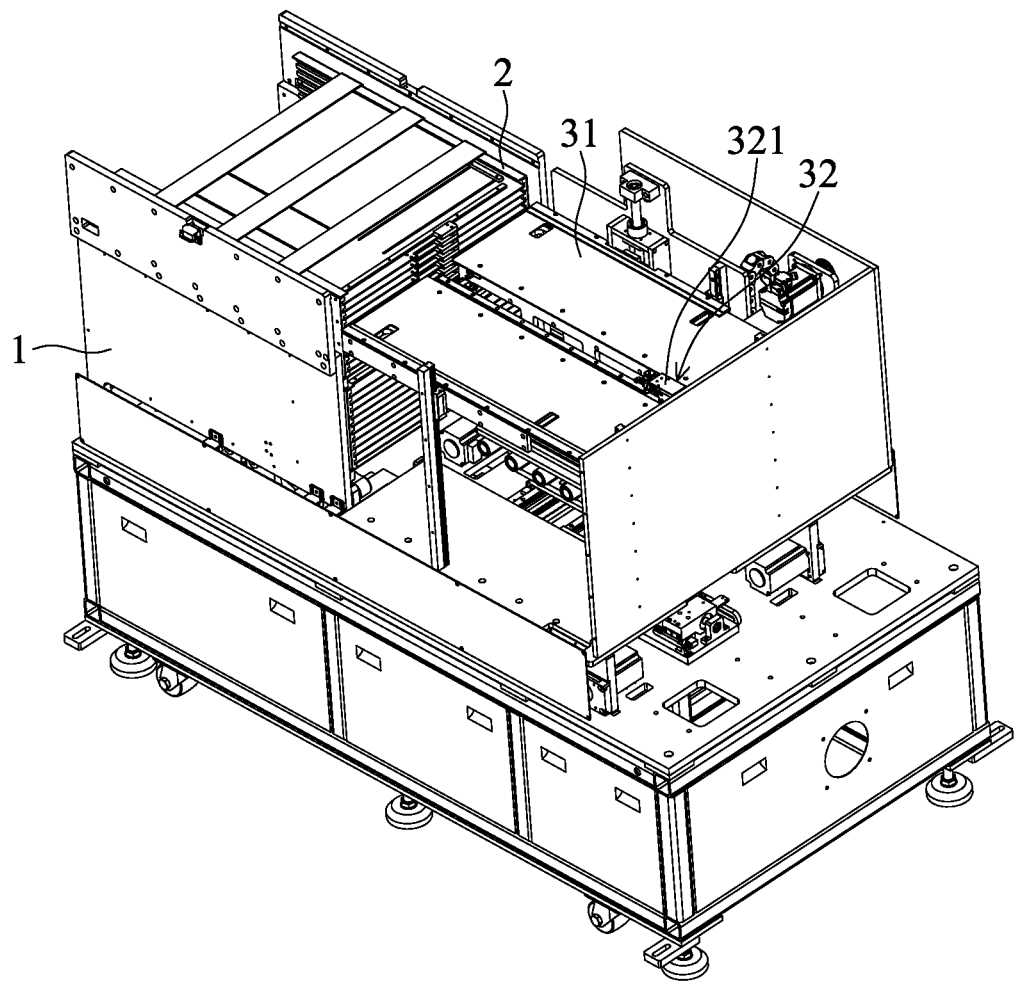
FIGS. 2A, 2B, 2C, 2D, 2E and 2F show the operation of an elevatable platform of the first embodiment of the invention.
Figure 2B:
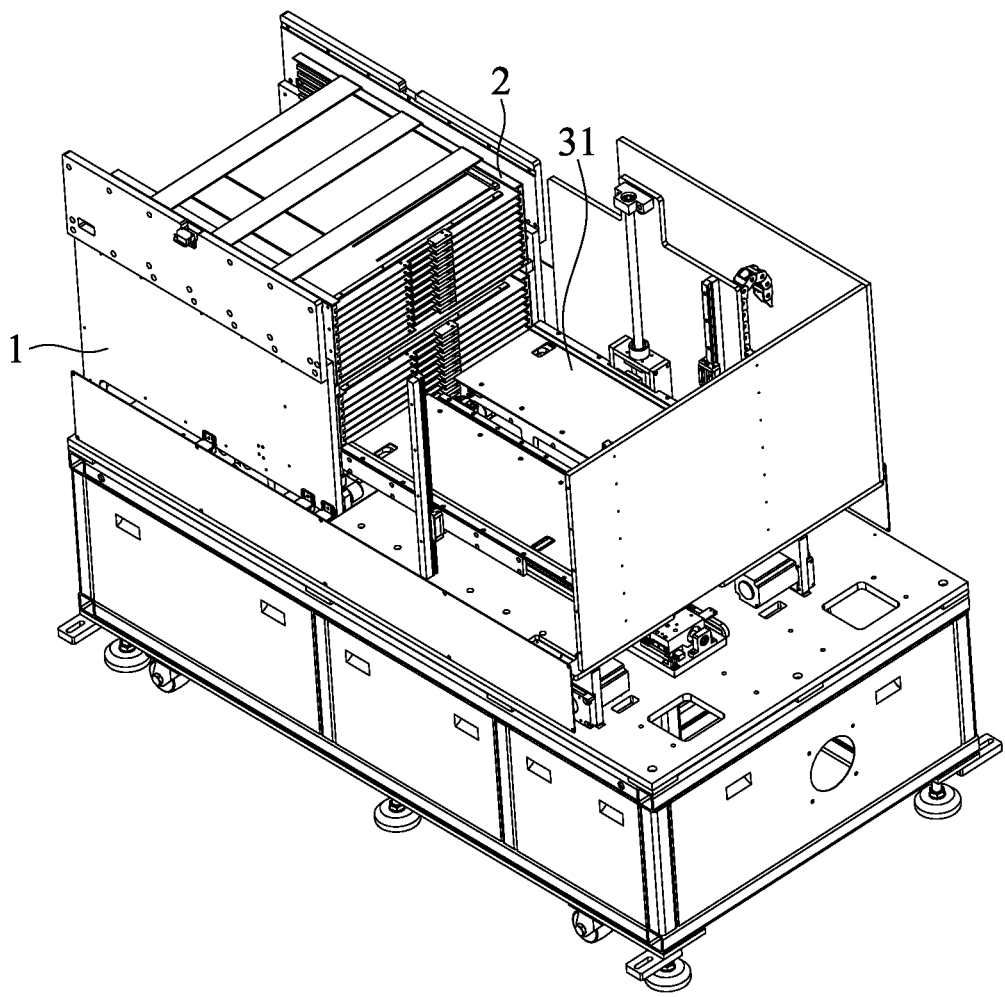

FIGS. 1A and 1B show a feeding apparatus of a first embodiment of the invention. FIGS. 2A, 2B, 2C, 2D, 2E and 2F show the operation of an elevatable platform of the first embodiment of the invention. With reference to FIGS. 1A, 1B, 2A, 2B, 2C, 2D, 2E and 2F, the feeding apparatus S1 of the first embodiment of the invention is adapted to pick up a plurality of electronic elements. The feeding apparatus S1 includes an apparatus body 1, a container 2, an elevatable platform 31, a pulling mechanism 32 and a robotic arm (not shown, will be shown in a second embodiment). The container 2 is detachably disposed in the apparatus body 1. The electronic elements M are received in the container 2. The elevatable platform 31 is disposed on the apparatus body 1, wherein the elevatable platform 31 is adapted to be moved between the first height (as shown in FIG. 2E) and the second height (FIG. 2B). The pulling mechanism 32 is disposed on the elevatable platform 31, wherein the pulling mechanism 32 is adapted to be moved horizontally to move the electronic elements M from the container 2 to the elevatable platform 31. The robotic arm (not shown) is adapted to pick up the electronic elements M from the elevatable platform 31.

Figure 2C:
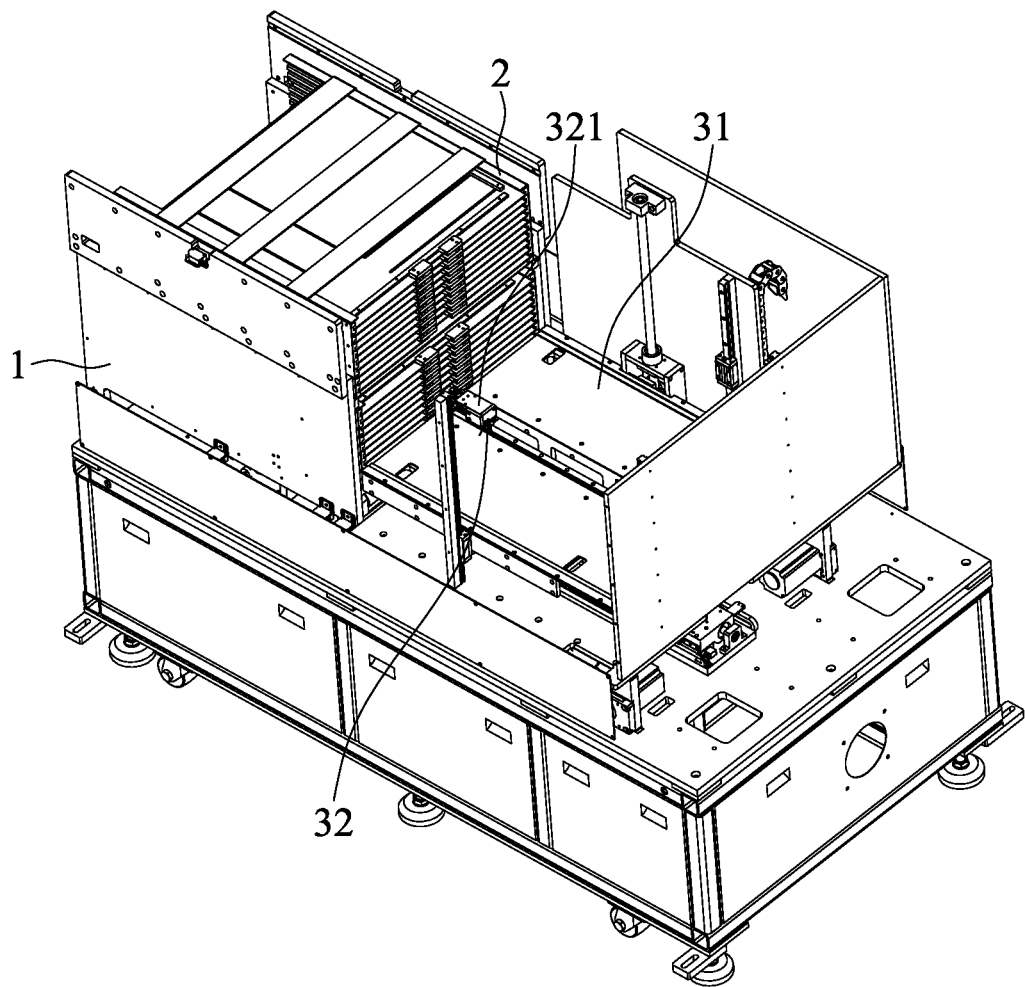
Figure 2D:
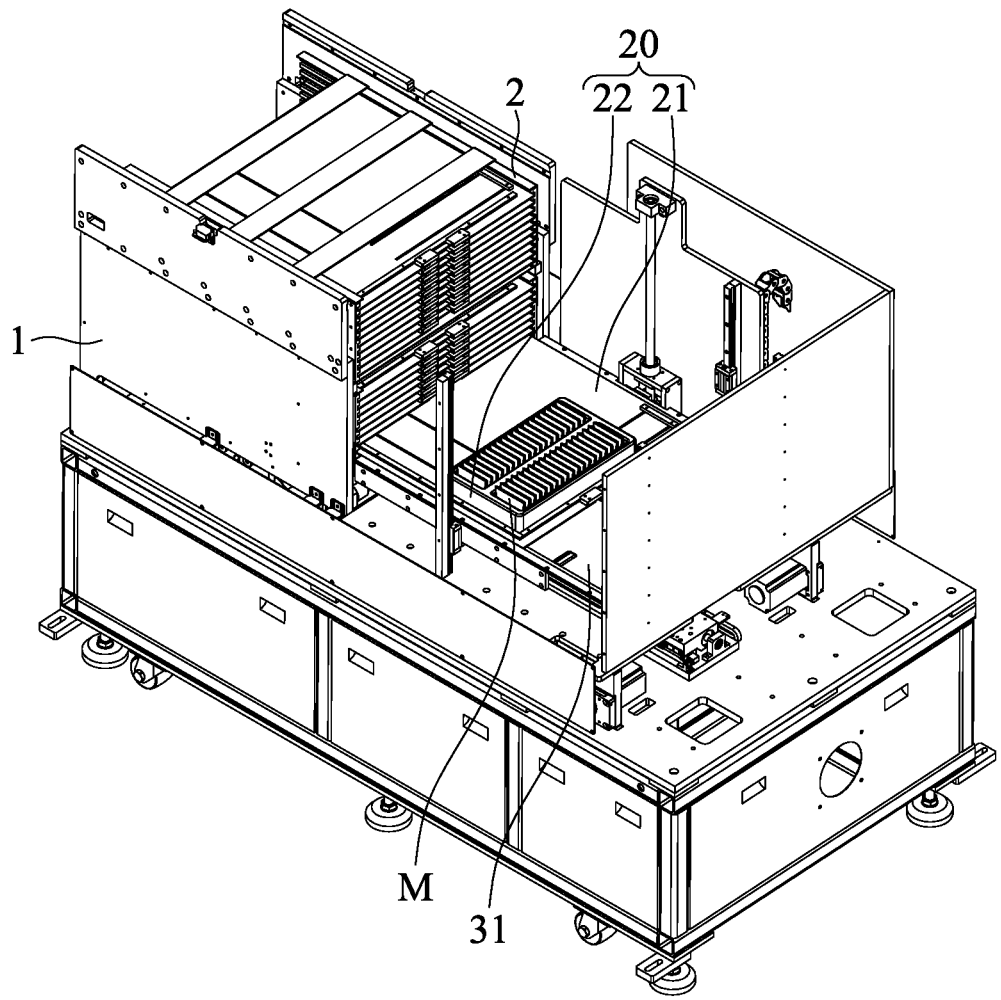
Figure 2E:
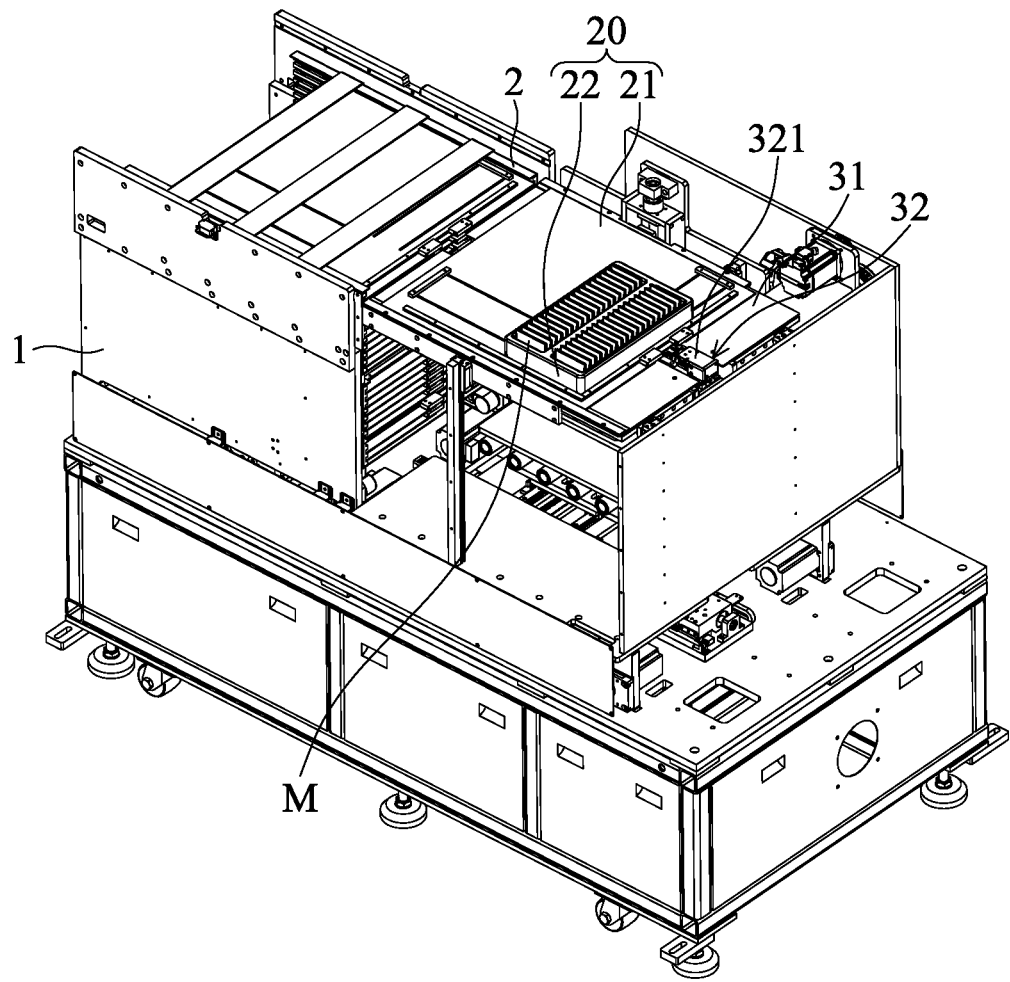
Figure 2F:
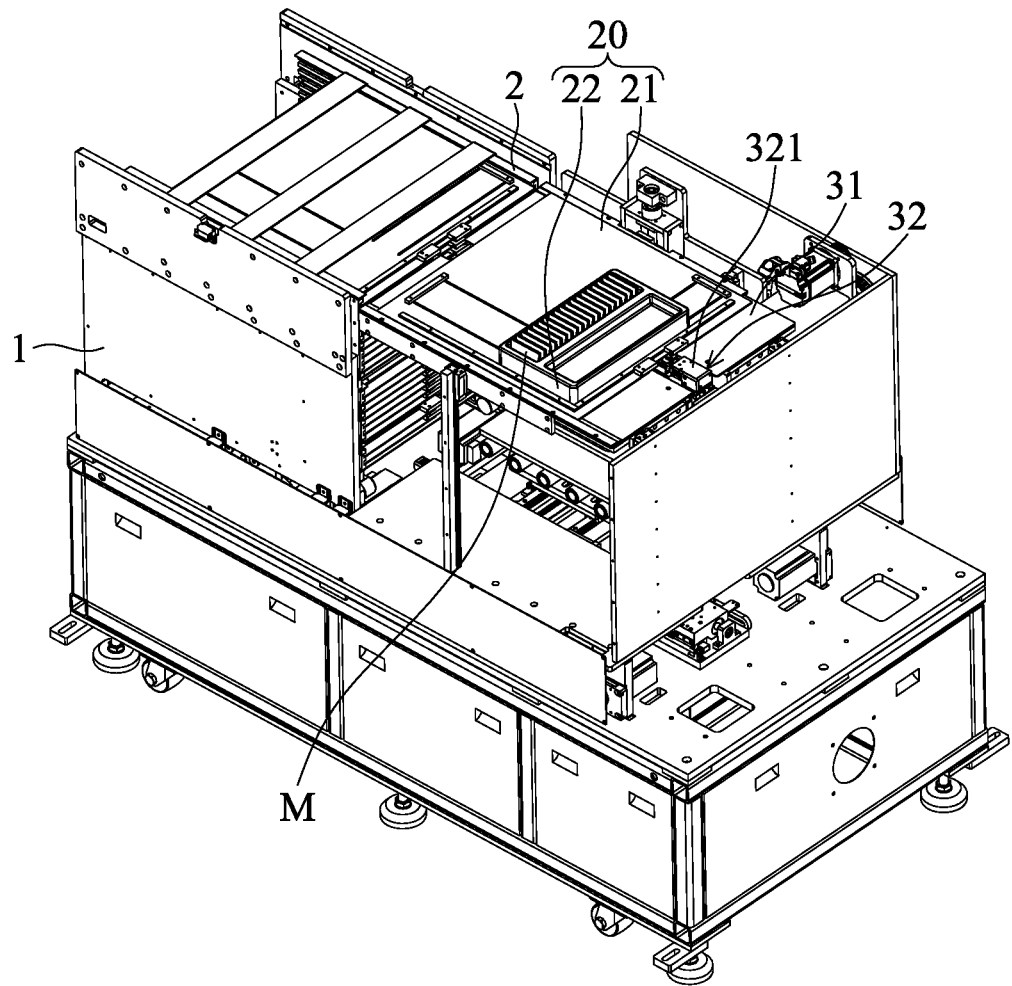

With reference to FIGS. 2C, 2D and 2E, in one embodiment, the container 2 has a carrier unit 20. The carrier unit 20 comprises a carrier plate 21 and a tray 22. The electronic elements M are adapted to be disposed on the tray 22. The tray 22 is disposed on the carrier plate 21. The pulling mechanism 32 is adapted to horizontally pull the carrier plate 21 and to move the carrier plate 21, the tray 22 and the electronic elements M from the container 2 to the elevatable platform 31.

The electronic elements M can be electronic elements of different heights (for example, module cards of different part numbers). The electronic elements M are disposed in the trays 22. The distance between the carrier plates can be changed according to different heights of electronic elements. As shown in FIG. 1A, the carrier plates 21 are disposed on positioning structures. In this embodiment, the positioning structures are guide grooves. The carrier plates can slide in the guide grooves, and the carrier plates can be replaced according to the heights of different electronic elements. For example, as shown in FIG. 1A, the electronic elements with increased height can be received in the space between the two carrier plates with increased distance h1 therebetween. The electronic elements with decreased height can be received in the space between the two carrier plates with decreased distance h2 therebetween. Therefore, the container can receive electronic elements of different heights by changing the gaps between the carrier plates.

Figure 3A:
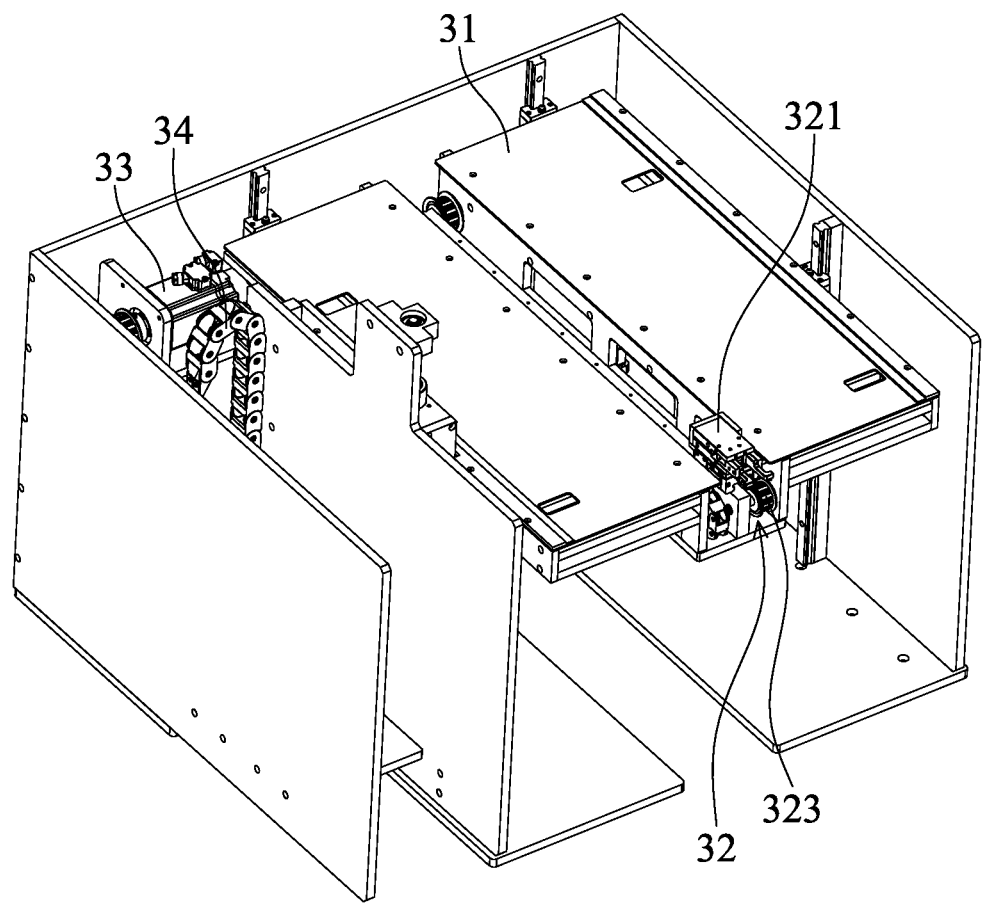
FIG. 3A shows the details of the elevatable platform of the embodiment of the invention.
Figure 3B:
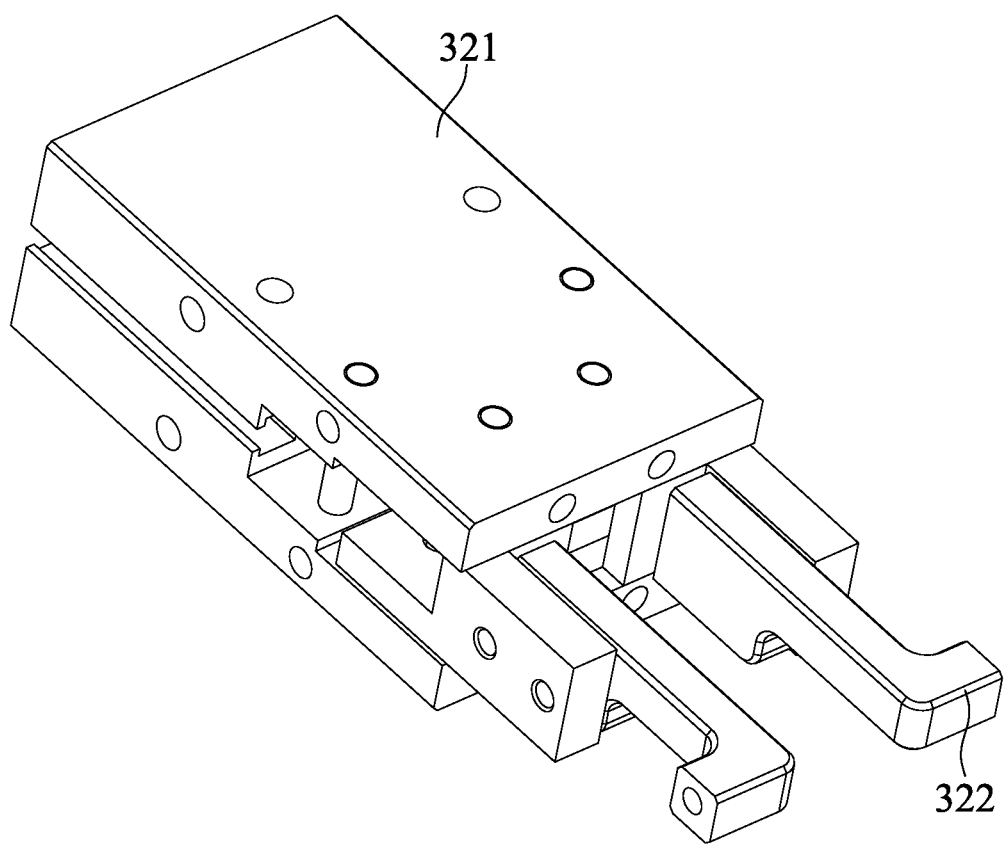
FIG. 3B shows the details of the hook unit of the embodiment of the invention.

FIG. 3A shows the details of the elevatable platform of the embodiment of the invention. FIG. 3B shows the details of the hook unit of the embodiment of the invention. With reference to FIGS. 2A, 2B, 2C, 2D, 2E, 2F, 3A and 3B, in one embodiment, the pulling mechanism 32 comprises a hook unit 321. The hook unit 321 is adapted to be moved between a first horizontal position (FIG. 2A) and a second horizontal position (FIG. 2C). The hook unit 321 is adapted to be wedged to the carrier plate 21 and to horizontally move the carrier plate 21 from the container 2 to the elevatable platform 31. Then, the elevatable platform 31 is raised from the first height (FIG. 2D) to the second height (FIG. 2E). The second height is closer to a robotic arm 4 (FIG. 7) than the first height. The electronic elements can be picked up by the robotic arm when the elevatable platform 31 is in the second height.

Figure 4A:
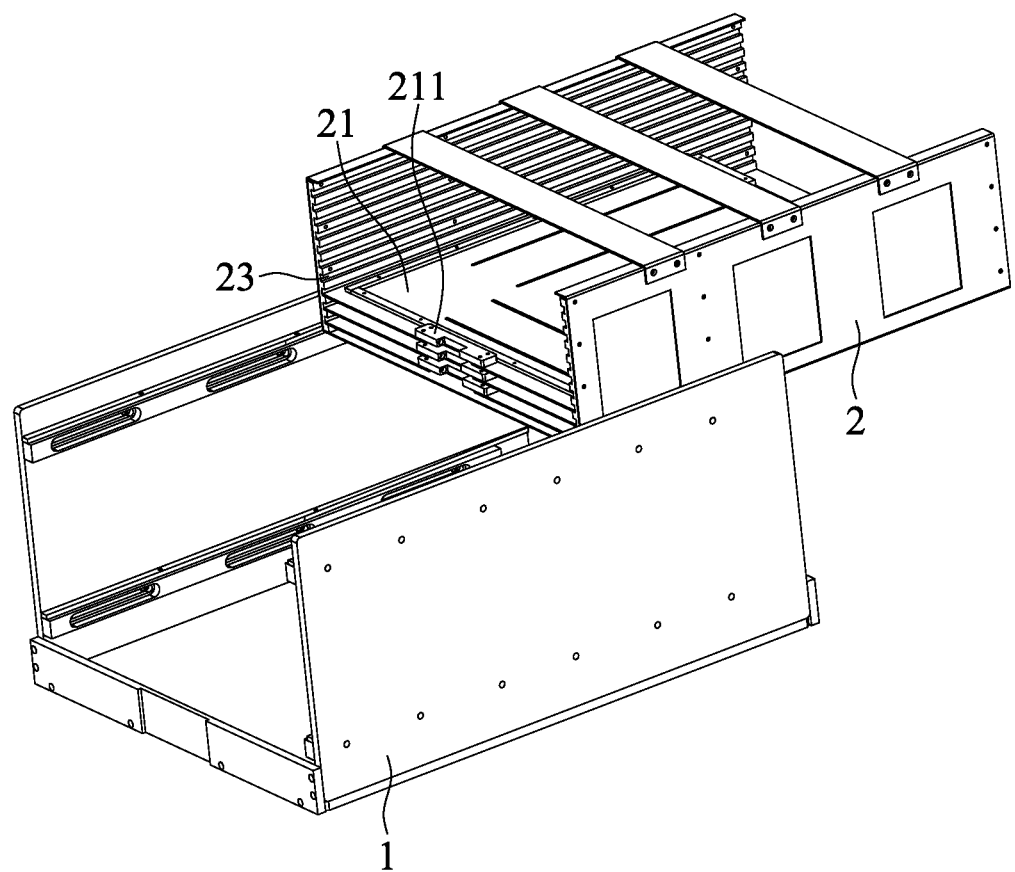
FIGS. 4A and 4B show the container and the apparatus body of the embodiment of the invention.
Figure 4B:
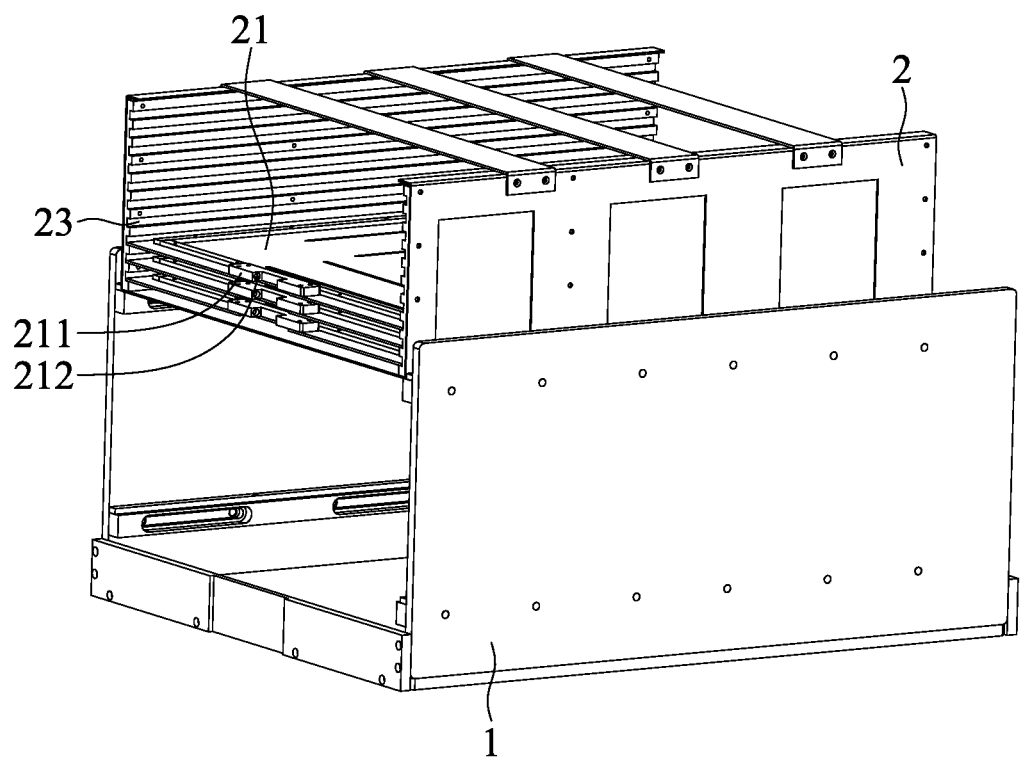

FIGS. 4A and 4B show the container and the apparatus body of the embodiment of the invention. With reference to FIGS. 1A, 1B, 4A and 4B, the containers 2 are disposed in the apparatus body 1, and can be horizontally moved and replaced. Each container 2 has a plurality of tracks 23, and the carrier plate 21 can be slid along the tracks 23.

With reference to FIGS. 2C, 3B and 4B, in one embodiment, the carrier plate 21 comprises a wedging member 211. The wedging member 211 comprises two opposite wedging holes 212 (FIG. 4B). The hook unit 321 comprises two hooks 322 (FIG. 3B), and the hooks 322 are adapted to be wedged into the wedging holes 212 (FIG. 2C). Therefore, the hook unit 321 is adapted to be wedged to the carrier plate 21, and horizontally move the carrier plate 21 from the container 2 to the elevatable platform 31.

With reference to FIG. 3A, in one embodiment, the pulling mechanism 32 further comprises a pulley 323 and a transmission belt (not shown) to move the hook unit 321 horizontally. The hook unit 321 comprises a cylinder to move the hooks 322. The elevatable platform 31 can be moved vertically by a motor 33 and a driving chain 34.

In one embodiment of the invention, different containers can store different electronic elements. The trays located on the carrier plates of different layers can also store different electronic elements. Thereby, the electronic elements can be managed in different layers. In the embodiment of the invention, the designated tray can be accurately and stably taken out by the elevatable platform and the pulling mechanism and the designated electronic element can be picked up by the robotic arm. Thereby, automatic feeding is achieved. Compared with the conventional art, the feeding apparatus of the embodiment of the invention can supply different types of electronic elements (for example, module cards with different part numbers) at any time to match the adjustment of the production line.

Figure 5:
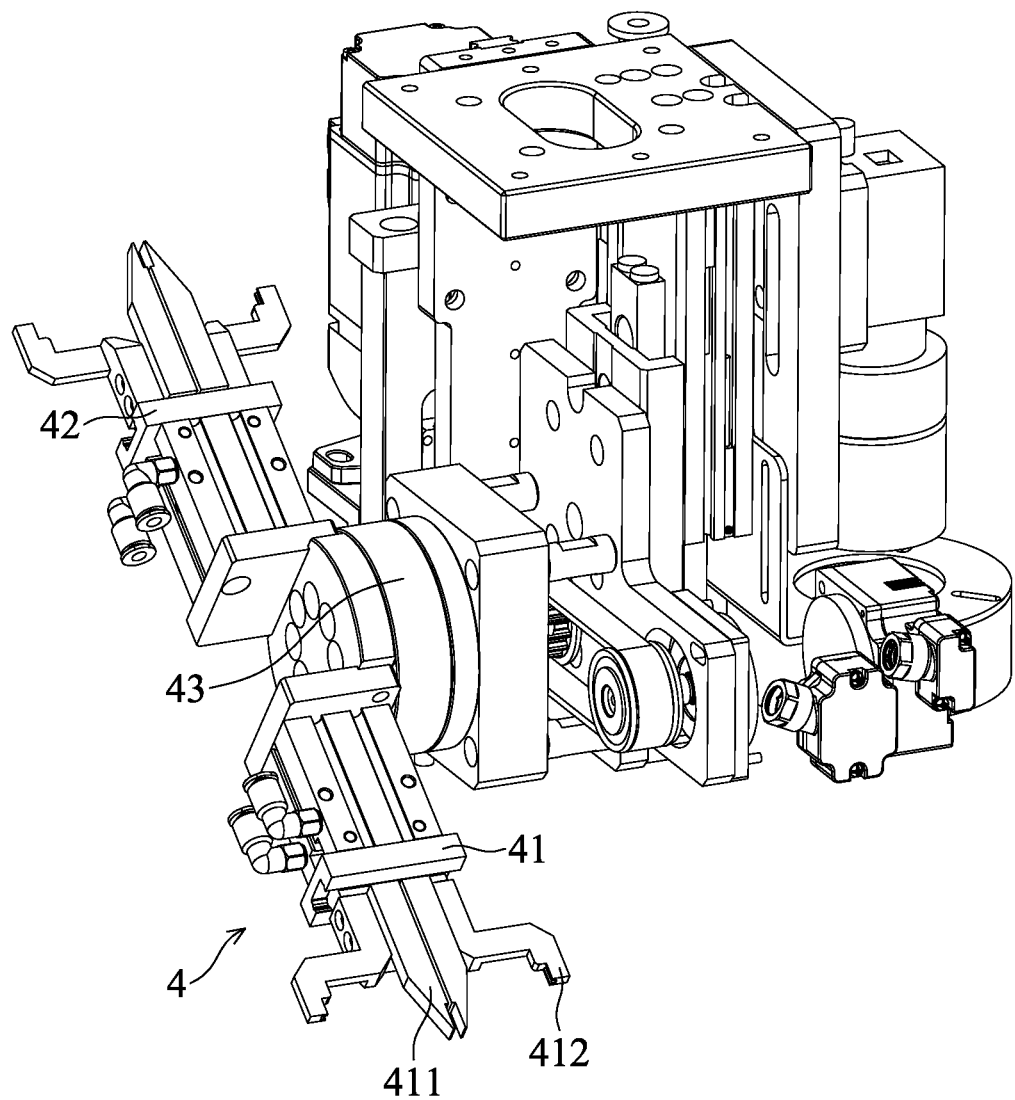
FIG. 5 shows the details of the robotic arm of the second embodiment of the invention.
Figure 6A:
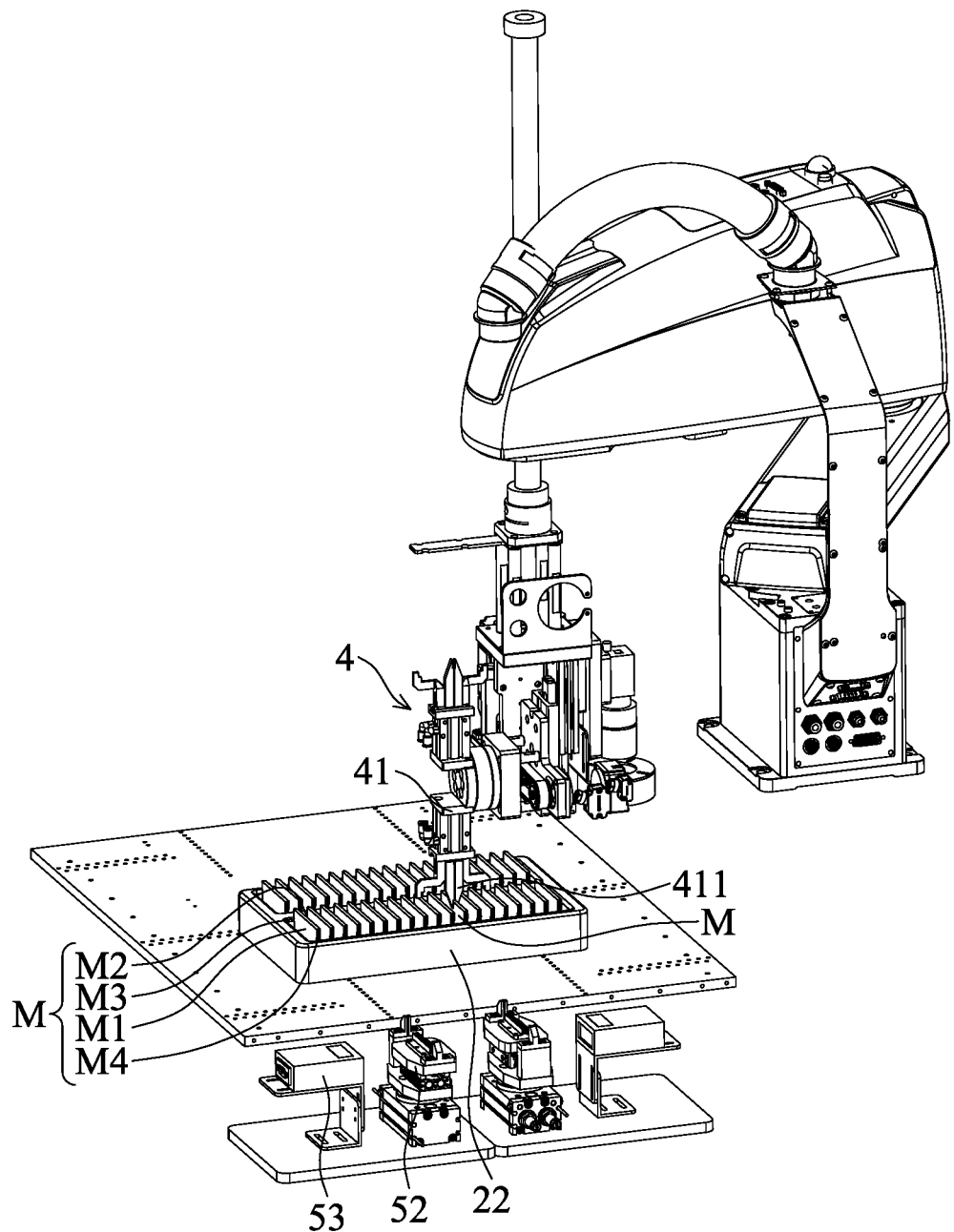
FIGS. 6A and 6B show the operation of the robotic arm of the second embodiment of the invention.
Figure 6B:
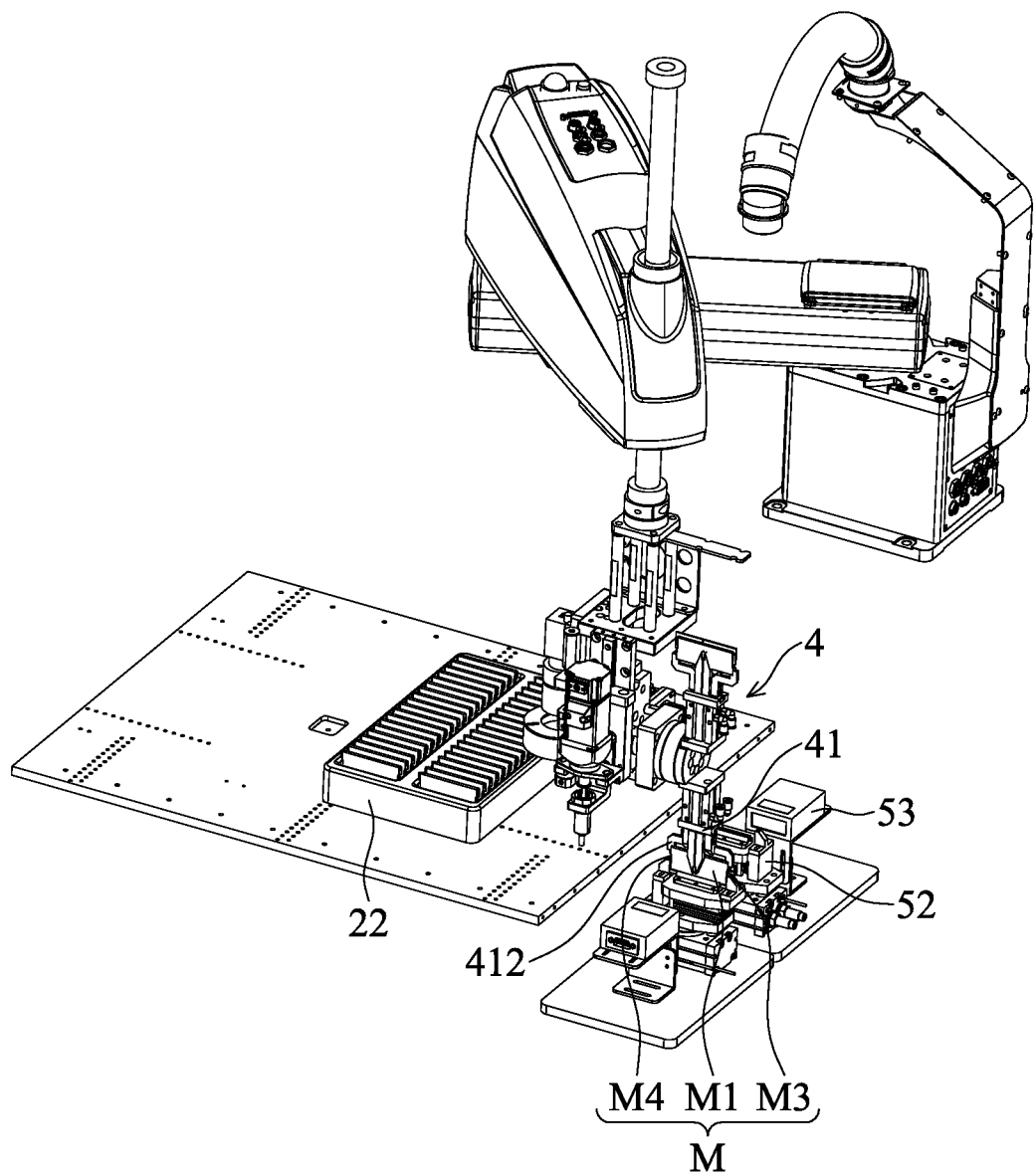

FIG. 5 shows the details of the robotic arm of the second embodiment of the invention. FIGS. 6A and 6B show the operation of the robotic arm of the second embodiment of the invention. With reference to FIGS. 5, 6A and 6B, in one embodiment, the robotic arm 4 comprises a first jaw unit 41. The first jaw unit 41 comprises two surface jaws 411 and two end jaws 412. The surface jaws 411 are adapted to hold the electronic element in a first direction relative to the electronic element (FIG. 6A). The end jaws 412 are adapted to hold the electronic element in a second direction relative to the electronic element (FIG. 6B). The first direction is perpendicular to the second direction.

With reference to FIGS. 6A and 6B, in one embodiment, the electronic element M is a module card. The module card M comprises a first surface M1, a second surface M2, a first edge M3 and a second edge M4. The first surface M1 is opposite to the second surface M2. The first edge M3 is opposite to the second edge M4. The first surface M1 and the second surface M2 are located between the first edge M3 and the second edge M4. The surface jaws 411 are adapted to hold the first surface M1 and the second surface M2, and the end jaws 412 are adapted to hold the first edge M3 and the second edge M4.

With reference to FIG. 5, in one embodiment, the surface jaws 411 are beak-shaped jaws. The end jaws 412 are L-shaped jaws. The surface jaws 411 and the end jaws 412 are utilized to hold the electronic element in different ways, and the electronic element is thus prevented from being damaged. The holding efficiency and the holding accuracy of the robotic arm are improved.

With reference to FIG. 5, in one embodiment, the robotic arm 4 comprises a second jaw unit 42. The first jaw unit 41 and the second jaw unit 42 are arranged facing opposite directions. The first jaw unit 41 and the second jaw unit 42 can be rotated via a shaft 43. The holding efficiency of the robotic arm 4 can be increased.

Figure 7:
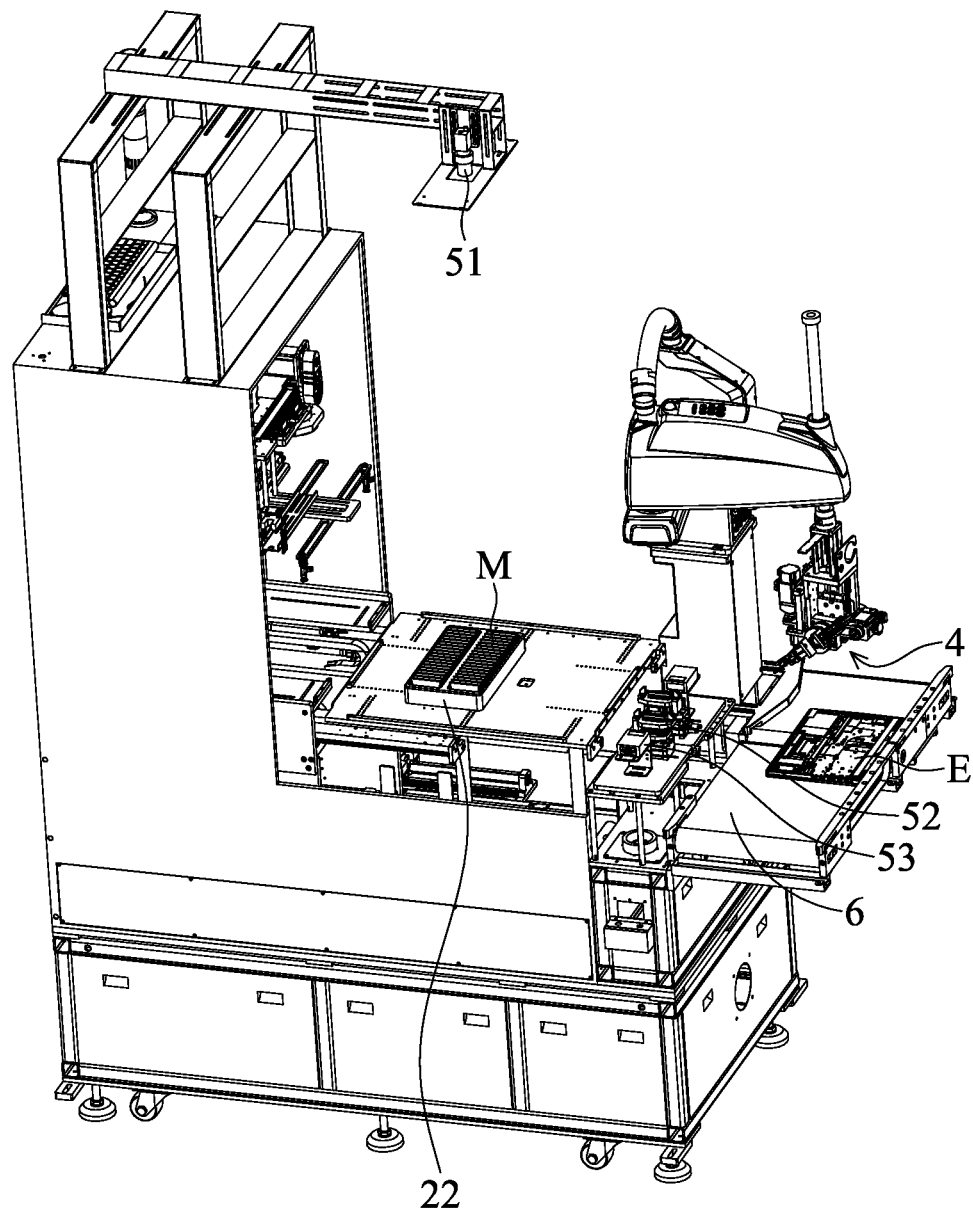
FIG. 7 shows the feeding apparatus of the second embodiment of the invention.

FIG. 7 shows the feeding apparatus of the second embodiment of the invention. With reference to FIG. 7, in one embodiment, the feeding apparatus S2 further comprises an image capturing unit 51. The image capturing unit 51 is disposed above the elevatable platform. The image capturing unit 51 is adapted to catch images of the tray 22 and the electronic elements M, and to identify the profile of the electronic element M.

Figure 8A:
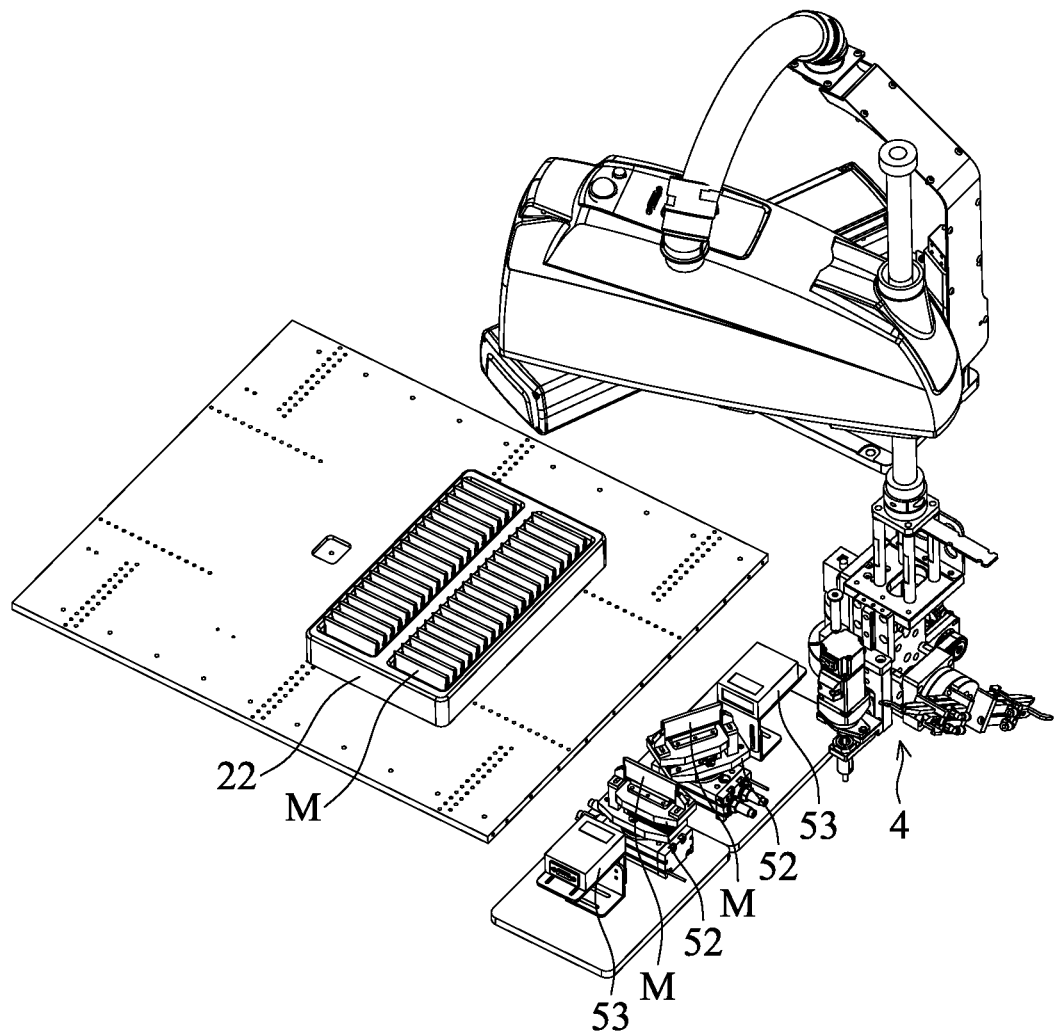
FIGS. 8A and 8B show the transit stage of the second embodiment of the invention.
Figure 8B:
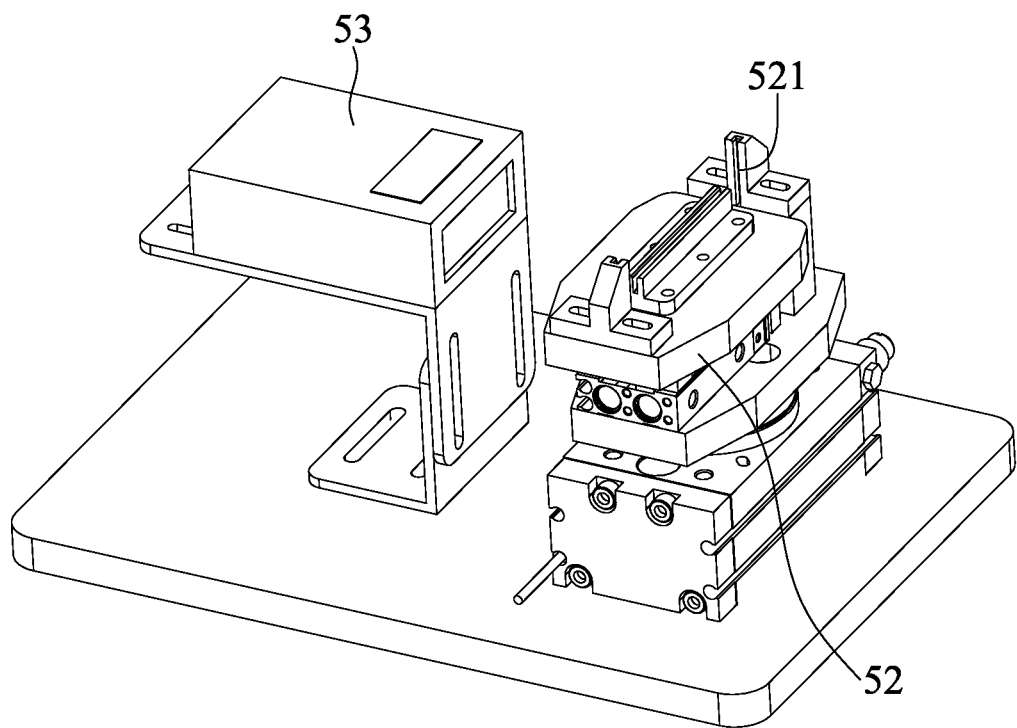

FIGS. 8A and 8B show the transit stage of the second embodiment of the invention. With reference to FIGS. 6A, 6B, 7, 8A and 8B, in one embodiment, the feeding apparatus S2 further comprises a transit stage 52 and a scanner 53. The robotic arm 4 is adapted to put one of the electronic elements M on the transit stage 52. The scanner 53 is adapted to scan the electronic element M on the transit stage 52. In one embodiment, the robotic arm 4 picks up the electronic element M form the tray 22 by the face jaws 411, and put the electronic element M on the transit stage 52 (FIG. 6B).

With reference to FIG. 8A, in one embodiment, the transit stage 52 is adapted to be rotated 180 degrees relative to the scanner 53 to modify the orientation of the electronic element M on it. The scanner 53 scans the electronic element M on the transit stage 52 to confirm the part number and the orientation of the electronic element M. If the orientation of the electronic element M relative to the scanner 53 is wrong, the transit stage 52 can rotate the electronic element M to modify the orientation of the electronic element M.

With reference to FIG. 8B, in one embodiment, the transit stage 52 comprises a slot 521, and the electronic element M is adapted to be inserted into the slot 521.

With reference to FIGS. 6B and 7, in one embodiment, the feeding apparatus S2 further comprises an assembly stage 6. An electronic device E is adapted to be placed on the assembly stage 6. The robotic arm 4 is adapted to pick up the electronic element M from the transit stage 52, and to assemble the electronic element M to the electronic device E. In one embodiment, the position of the electronic device E can be confirmed by the scanner. The robotic arm 4 picks up the electronic device E from the transit stage 52 by the end jaws 412, and assembles the electronic element M to the electronic device E (FIG. 6B). The jaws of the robotic arm 4 are prevented from being hitting the electronic element M unexpectedly.

In the embodiment of the invention, the assembling efficiency and the reliability of the product are improved by utilizing the robotic arm and the transit stage. Additionally, the jaws of the robotic arm are prevented from being hitting the electronic element unexpectedly.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A feeding apparatus, adapted to receive electronic elements of different sizes, comprising:
    an apparatus body;
    a container, disposed in the apparatus body, wherein the elements are received in the container;
    an elevatable platform, disposed on the apparatus body, wherein the elevatable platform is adapted to be moved vertically;
    a pulling mechanism, disposed on the elevatable platform, wherein the pulling mechanism is adapted to be moved horizontally to move the electronic elements from the container to the elevatable platform; and
    a robotic arm, wherein the robotic arm comprises a first jaw unit, the first jaw unit comprises two surface jaws and two end jaws, and the surface jaws and the end jaws are rotatably disposed on the robotic arm, wherein the surface jaws and the end jaws are offset from each other along a first direction, such that end portions of the surface jaws configured to hold the elements in a first orientation are located on a first plane, and end portions of the end jaws configured to hold the elements in a second orientation are located on a second plane offset from and parallel to the first plane.

2. The feeding apparatus as claimed in claim 1, wherein the container has a carrier unit, the carrier unit is detachably connected to the container, the carrier unit comprises a carrier plate and a tray, the electronic elements are adapted to be disposed on the tray, the tray is disposed on the carrier plate, and the pulling mechanism is adapted to horizontally pull the carrier plate and to move the carrier plate, the tray and the electronic elements from the container to the elevatable platform.

3. The feeding apparatus as claimed in claim 2, wherein the pulling mechanism comprises a hook unit, the hook unit is adapted to be moved between a first horizontal position and a second horizontal position, and the hook unit is adapted to be wedged to the carrier plate and to horizontally move the carrier plate from the container to the elevatable platform.

4. The feeding apparatus as claimed in claim 3, wherein the carrier plate comprises a wedging member, the wedging member comprises two opposite wedging holes, the hook unit comprises two hooks, and the hooks are adapted to be wedged into the wedging holes.

5. The feeding apparatus as claimed in claim 1, wherein the electronic element is a module card, the module card comprises a first surface, a second surface, a first edge and a second edge, the first surface is opposite to the second surface, the first edge is opposite to the second edge, the first surface and the second surface are located between the first edge and the second edge, the surface jaws are adapted to hold the first surface and the second surface, and the end jaws are adapted to hold the first edge and the second edge.

6. The feeding apparatus as claimed in claim 5, wherein the surface jaws are beak-shaped jaws.

7. The feeding apparatus as claimed in claim 5, wherein the end jaws are L-shaped jaws.

8. The feeding apparatus as claimed in claim 1, wherein the robotic arm comprises a second jaw unit, and the first jaw unit and the second jaw unit are arranged facing opposite directions.

9. The feeding apparatus as claimed in claim 1, further comprising an image capturing unit, wherein the image capturing unit is disposed above the elevatable platform, and the image capturing unit is adapted to catch images of the tray and the electronic elements.

10. The feeding apparatus as claimed in claim 1, further comprising a transit stage and a scanner, the robotic arm is adapted to put one of the electronic elements on the transit stage, and the scanner is adapted to scan the electronic element on the transit stage.

11. The feeding apparatus as claimed in claim 10, wherein the transit stage is adapted to be rotated 180 degrees relative to the scanner to modify an orientation of the electronic element thereon.

12. The feeding apparatus as claimed in claim 10, wherein the transit stage comprises a slot, and the electronic element is adapted to be inserted into the slot.

13. The feeding apparatus as claimed in claim 10, further comprising an assembly stage, wherein an electronic device is adapted to be placed on the assembly stage, and the robotic arm is adapted to pick up the electronic element from the transit stage and to assemble the electronic element to the electronic device.

14. A feeding apparatus, comprising:
an apparatus body;
a container, disposed in the apparatus body, wherein the container has a carrier unit, and the carrier unit is detachably connected to the container;
an elevatable platform, disposed on the apparatus body, wherein the elevatable platform is adapted to be moved between a first height and a second height;
a pulling mechanism, disposed on the elevatable platform, wherein the pulling mechanism is adapted to be moved relative to the container; and
a robotic arm, wherein the robotic arm comprises a first jaw unit, the first jaw unit comprises two surface jaws and two end jaws, in a first holding state, the surface jaws hold two opposite surfaces of the electronic element, and the end jaws are not working, and in a second holding state, the end jaws hold two opposite ends of the electronic element, and the surface jaws are not working.

* * * * *